United States Patent [19]

Imhof et al.

[11] Patent Number: 5,246,797
[45] Date of Patent: Sep. 21, 1993

[54] ELECTRODE MATRIX HAVING HOLLOW OR FIBROUS STRUCTURE AND WELDED-ON CURRENT-COLLECTOR LUG

[75] Inventors: Otwin Imhof, Nürtingen; Willi Kitzhöfer, Petersborn, both of Fed. Rep. of Germany

[73] Assignees: Deutsche Automobilgesellschaft mbH; Daug-Hoppecke Gesellschaft für Batteriesysteme mbH, both of Fed. Rep. of Germany

[21] Appl. No.: 835,687

[22] Filed: Feb. 14, 1992

[30] Foreign Application Priority Data

Feb. 16, 1991 [DE] Fed. Rep. of Germany ....... 4104865

[51] Int. Cl.$^5$ ..................... H01M 2/26; H01M 4/66
[52] U.S. Cl. ................... 429/211; 429/234; 429/235
[58] Field of Search .............. 429/211, 234, 235

[56] References Cited

U.S. PATENT DOCUMENTS

| | | | |
|---|---|---|---|
| 2,861,115 | 11/1958 | Berg | 429/211 |
| 4,760,001 | 7/1988 | Nann et al. | 429/211 X |
| 5,085,956 | 2/1992 | ImIhof et al. | 429/211 |
| 5,086,969 | 2/1992 | Guerinault et al. | 429/211 X |

FOREIGN PATENT DOCUMENTS

| | | |
|---|---|---|
| 3142091 | 5/1984 | Fed. Rep. of Germany . |
| 3026778 | 6/1984 | Fed. Rep. of Germany . |
| 3632351 | 10/1987 | Fed. Rep. of Germany . |
| 3734131 | 12/1988 | Fed. Rep. of Germany . |
| 4032610 | 10/1991 | Fed. Rep. of Germany . |

*Primary Examiner*—Stephen Kalafut
*Attorney, Agent, or Firm*—Evenson, McKeown, Edwards & Lenahan

[57] ABSTRACT

An electrode matrix with hollow or fibrous structure made of metallized and, optionally, subsequently removed plastic fibers, and a current-collector lug welded-on on one side for electrochemical storage cells. The current-collector lug overlaps the electrode matrix at the periphery on one side, the latter being compressed in the vicinity of the overlap in such a way that the current-collector lug remains within the nominal thickness of the electrode matrix. The current-collector lug has, in the overlap region, a plurality of material projections which project in the direction of the electrode matrix, whose diameters correspond at least approximately to the material thickness of the current-collector lug and which are pressed into the electrode matrix, each material projection pressed into the electrode matrix still remaining, however, completely inside the electrode matrix even at the point of its highest elevation. Each material projection is formed as a collar of a plurality of projecting material tabs which are twisted out of their projecting position and are keyed into the compressed electrode matrix.

10 Claims, 3 Drawing Sheets

ELECTRODE MATRIX HAVING HOLLOW OR FIBROUS STRUCTURE AND WELDED-ON CURRENT-COLLECTOR LUG

BACKGROUND AND SUMMARY OF THE INVENTION

The present invention relates to an electrode matrix with a hollow or fibrous structure made of metallized (and optionally subsequently removed plastic fibers), and a welded-on thin current-collector lug for batteries or galvanic cells, of the generic type disclosed by German patent documents DE-PS 36 32 351 and DE-PS 40 32 610.

The fibrous structure electrode described in German Patent Specification 36 32 351 is made of metallized plastic fibers and provided with a current-collector lug welded onto one side. The current-collector lug overlaps the electrode at the periphery on one side, the fibrous structure electrode being compressed in the vicinity of the overlap in such a way that the current-collector lug remains within the nominal thickness of the fibrous structure electrode. The current-collector lug is welded to the electrode by a plurality of material projections which are disposed in the overlap region and which extend in the direction of the electrode. The material projections pressed into the electrode still remain completely inside the electrode even at the point of their highest elevations after the welding.

The joint thus formed between the current-collector lug and the electrode matrix is generally sufficiently strong to withstand stresses encountered in the pulling direction of the current-collector lug attached to the terminal towards the electrode matrix loaded with active mass. For stresses applied transversely to the electrode matrix after it is filled with active mass (splitting off), or for continuous vibratory loadings, however, the strength is too low. Moreover, other more robust electrode matrices with mounted current-collector lugs are too expensive because of their complicated current-collector lug shape which must be prepared using special tools and working steps, or because of the large number of joints for maximum-load cells with many narrow electrodes per stack.

German Patent Specification 30 26 778 discloses an electrode matrix in which the current-collector lug has toothed projections which are pressed into the matrix. The current-collector is joined to the porous matrix by an electrolytic metal deposit, and remains inside the thickness extension of the electrode matrix. However, during vibration loading, the joint is very weak, and the projections may vibrate out of the electrode matrix again. Furthermore, cracks are formed during the penetration of the projections into the electrode matrix, which weakens the joint.

German Patent Specification 37 34 131 describes a current-collector lug which is divided into at least three tongues, alternately bent on one or both sides out of the plane of the lug, which is pushed over preferably compacted area of the fibrous structure electrode matrix and is attached to the latter by means of spot welds. In this case too, the strength of the joint under extreme stress is low.

German Patent Specification 31 42 091 discloses a method of producing a fibrous structure electrode having a reinforced periphery to which the current-collector lug is attached by rivets or welding or is pushed into the slotted periphery. The resulting joint suffers from the same disadvantages described above.

The object of the present invention, therefore, is to provide an electrode matrix having a hollow or fibrous structure and welded-on thin current-collector lug in which: no crack formation (or only a small crack formation) occurs in the electrode matrix in the vicinity of the welded joint; good contact is produced over the entire weld zone (particularly in the peripheral portions) of the electrode matrix; and the welded joint has a high strength not only for tensile stresses but also for stresses in the transverse direction. Electrode matrices according to the invention can be used, inter alia, in traction batteries and also in maintenance-free cells, such as in aerospace batteries.

This and other objects and advantages are achieved according to the invention, in which the thin metallic current-collector lug welded onto the electrode matrix has a rectangular cross section. In the vicinity of the lower periphery of the current-collector lug, material projections are impressed which are pierced in the center to form sharp edges so that the sheet-metal tabs forced out project almost at a right angle, or slightly away from the central perpendicular to the current-collector plane. The pierced material projections need not be arranged in a row, but must be in a region in which the current-collector lug and the electrode matrix overlap before welding.

As a rule, it is advantageous to increase the number of the pierced material projections towards the left and right periphery of the current-collector lug and near the center of its lower periphery, with a lower number of pierced material projections per unit length in the area in between. The edge of the electrode matrix, which advantageously has a thickness of between 0.3 mm and 5 mm, may be situated within a region between 2 mm and 5 mm below the current-collector lug before the welding operation. An overlap in the region between 3 mm and 5 mm is preferred. If the electrode matrix is too far below the end of the current-collector lug, there is a risk, after welding, that it will project out of the upper matrix plane, increasing the risk of short-circuit formation in the assembled cell. If, on the other hand, the electrode matrix is at too small a distance below the end of the current-collector lug according to the invention, an unsatisfactorily small weld zone is produced between the electrode matrix and the current-collector lug, so that the action of the pierced material projections cannot be effective.

At the beginning of the welding operation, as the upper and lower welding electrodes are brought together, the projecting sheet-metal tabs of the pierced material projections on the underside of the current-collector lug are the first to penetrate the lug neck of the electrode matrix which has not yet been compacted and impressed. As a result of the pressing operation of the welding electrodes, the electrode matrix zone in which the current-collector lug and the electrode matrix overlap, is compacted, and the sheet-metal tabs simultaneously key into the electrode matrix. In the subsequent compacting process, the sheet-metal tabs are twisted or bent over in the cavities and interstices of the electrode matrix and correspond to a positive or nonpositive joint after completion of the compacting process. Moreover, they also have an intimate contact with the fibers of the matrix electrode, some of which are torn and also twisted and pinched at these points.

In choosing the number of material projections, care should be taken. If the spacing between the individual projections is too small, the electrode matrix is severely weakened during the welding operation and may break off during high stressing immediately below or at the pierced row of material projections, as if at a perforation. It has been found that the pierced material projections are preferably arranged at a spacing of between 1 mm and 2.5 mm from the lower periphery of the current-collector lug, and at a spacing of between 1.5 mm and 2 mm from one another. Furthermore, the pierced material projections should end up below the reinforced periphery of the electrode matrix, which is mechanically more robust than the rest of the electrode matrix, so that they can penetrate the electrode matrix and can alter themselves more easily. In this connection, a value of approximately 1 mm has been found to be the most favorable spacing of the pierced material projections from the reinforced periphery of the electrode matrix. The welding then occurs primarily in all those regions in which the contact between the current-collector lug and the electrode matrix is the most favorable. This is the case at the specific points having the pierced material projections over the entire lower zone of the current-collector lug and in the region in which the welding electrode projects most and extends parallel to the lower face of the electrode matrix and also to the lower welding electrode.

By further shaping the welding electrode resting on the current collector lug, it is possible to achieve a constant thickness of approximately 50 to 60% of the full thickness of the electrode matrix in the parallel extending and most heavily pressed region of the compressed electrode matrix almost to the end of the current-collector lug in the direction of the lower side of the current-collector lug, with the periphery of the current-collector lug tapering to about 70% to 80% of the full thickness of the electrode matrix in a gradually curved transition (radius) to the left, downwards and to the right starting from the area of the current-collector lug which overlaps the electrode matrix. The taper of the pressed-in and welded-in current-collector lug in the three directions mentioned, over the periphery of the current-collector lug starts in the electrode matrix without any step until the normal height of the upper structural surface of the electrode matrix is reached. As a result of the smooth transition (that is, by avoiding abrupt steps), the electrode matrix is not too severely constricted even at the end of the current-collector lug. This avoids cracks and unduly small bearing cross sections in the electrode matrix, and results in an improved mechanical robustness of the welded joint both during tensile and during flexural stressing. In addition, it is advantageous to round off the corners of the current-collector lug during punching.

Metallized plastic-fiber matrices, in particular felts, needle-punched felts, nonwovens or the like, and hollow-fiberstructure electrodes such as are proposed, for example, in German patent document DE-PS 40 32 610, are used as electrodes matrices. Preferably, these materials should have a porosity (in the unprocessed state) between 50% and 98% and a weight per unit area of between 50 grams per square meter and 100 grams per square meter; their fibers should have a diameter of 0.4 dtex to 7.3 dtex and a length of 15 to 80 mm. The activation, metallization and reinforcement by electroplating are carried out by the convention techniques, with nickel and copper, in particular, being used as metallized coating on the fibers. In the case where nickel is used, the coating of the electrode matrix is preferably between 25 and 300 milligrams per square centimeter of the electroplated material. The plastic materials which are also suitable for textile fibers, for example polyolefins, polyamides, polyacrylonitrile and the like, are suitable as material for the fibers, provided they are resistant to the electrolyte or expellable from the metallic skin. At the periphery where the current-collector lug is to be mounted, the electrode matrices are preferably provided with a peripheral reinforcement obtained by a thicker metal coating on the fibers situated at that point.

Other objects, advantages and novel features of the present invention will become apparent from the following detailed description of the invention when considered in conjunction with the accompanying drawings.

DETAILED DESCRIPTION OF THE DRAWINGS

Figure 1:
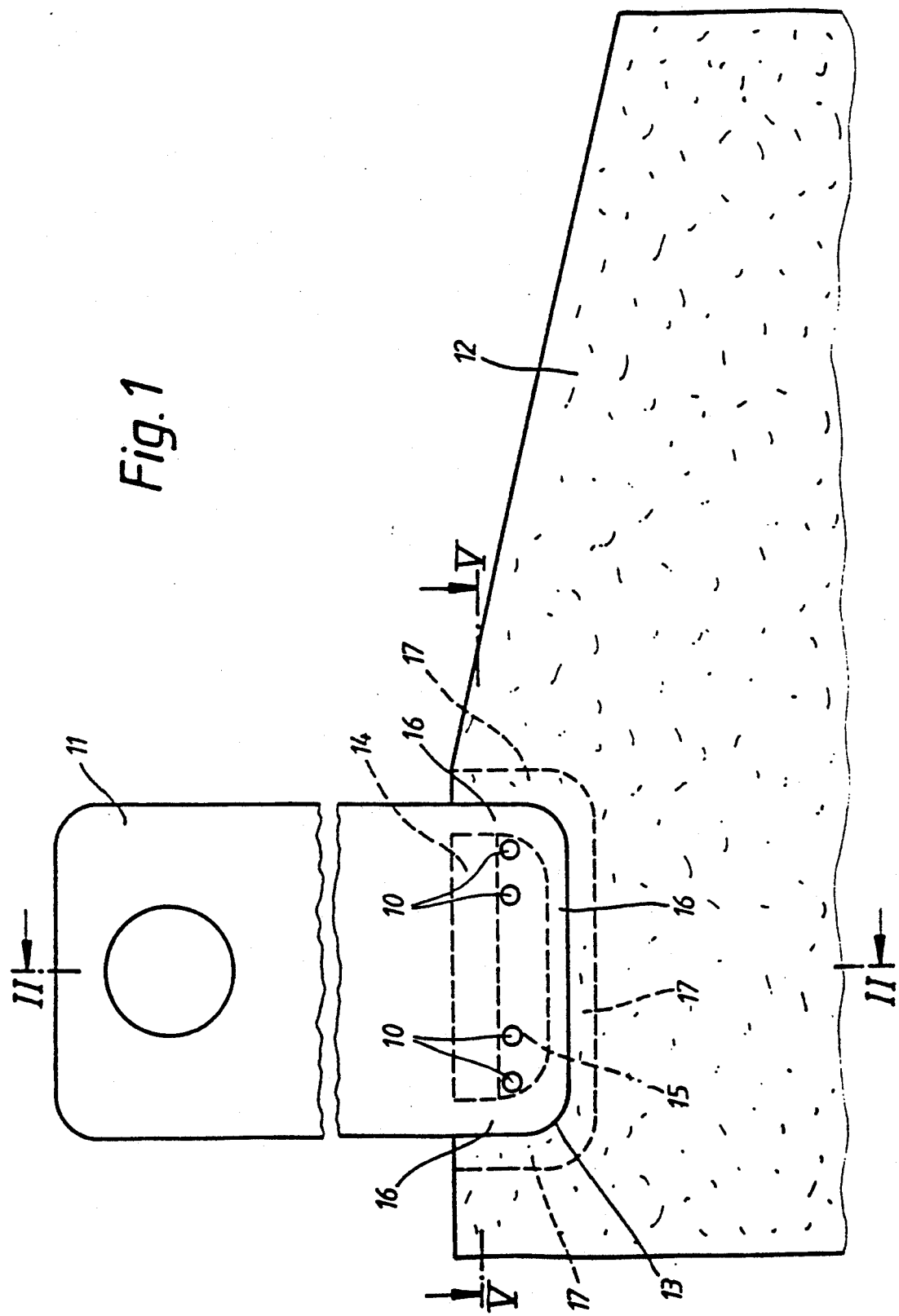
FIG. 1 shows an electrode matrix with current-collector lug mounted in a front view.

FIG. 1 shows the current-collector lug 11, the position of four pierced material projections and the electrode matrix 12 after the welding operation (not to scale). Contact is made to the electrode matrix 12 off center. Located at the upper side in the left-hand corner is the fixing of the current-collector lug 11 provided with pierced material projections. A slope of approximately 10° starts at the upper periphery of the electrode matrix 12 on the left-hand side next to the current-collector lug 11, so that the height of the plate is less at the right-hand periphery. The thickness of the current-collector lug 11 is approximately 0.2 mm, it being constructed as a nickel sheet-metal strip having a height of approximately 24 mm. At the peripheries, the current-collector lug 11 is rounded off with a radius of approximately 2 mm. In its upper region remote from the electrode matrix 11, it has a through hole at a spacing of 5 mm from the upper periphery. Four material projections having an internal diameter of approximately 0.6 to 0.8 mm are pierced through in the lower region of the current-collector lug 11 at a spacing of 3 mm and 5 mm on the left and on the right in a mirror-inverted position with respect to the center line of the current-collector lug 11, and at a spacing of approximately 2 mm from the lower periphery of the current-collector lug 11, so that the height of the tips of the projecting sheet metal tabs 10 is approximately between 0.5 mm and 0.9 mm.

In the case of thin electrode matrices sized to a thickness of 0.8 mm—the textile plate substrate is 110 g/m$^2$ and the nickel coating 60 mg of Ni/cm$^2$, whereas in the case of thicker matrices—sized to a thickness of 1.4 mm—the textile plate substrate is about 125 g/m$^2$ and the nickel coating is 150 mg of Ni/cm$^2$.

Before welding, the porosity of the thin electrode matrix is 76% and that of the thick electrode matrix approximately 79%. The pressure for the welding electrode force is approximately 1.6 bar in the case of thick electrode matrices. For thin electrode matrices the current level is 45% and for thick electrode matrices 58%, the current time being set constant at 25 cycles both for the thin and for the thick electrode matrices. The squeeze time, closure time, post-weld hold time and off time in the case of a resistance welding machine are likewise the same both for the thin and for the thick electrode matrices. Before the welding process, the current-collector lug 11 provided with four pierced material projections was a rectangular thin sheet-metal section with rounded edges 13 and was positioned on the upper face of the electrode matrix 12 with a template in such a way that an overlap of approximately 4 mm existed. The welding takes place essentially in the zone 14 and at the transition from the zone 14 to the zone 15, in which the upper welding electrode 19 (FIG. 2) is formed parallel to the lower face of the electrode matrix 12 and projects most. The highest pressures, the best contacts and the highest welding currents occur in these zones 14, 15, owing, inter alia, to the reinforced periphery of the electrode matrix 12 and the sheet-metal tabs 10 of the pierced metal projections impressed into the electrode matrix 12.

Adjacent to the two zones 14 and 15 described above is a further zone 16 in which the upper welding electrode 19 has a curved shape (radius). At the three peripheries of the current-collector lug 11, said zone 16 is formed so as to cover the electrode matrix 12 to the left, downwards and to the right and is approximately 1 to 2 mm. It is, however, also possible not to form said zone 16 with a radius but to allow it to run continuously at the transition, for example with a chamfer of 4° and rounded edges. Such a welding electrode with a continuous transition is easier to produce in terms of production engineering and easy to recondition if worn. The uppermost periphery of the current-collector lug 11 of the Zone 16 is still pressed 20% to 30% into the electrode matrix 12. Adjacent to the zone 16 is a further zone 17 which forms a transition to the point at which the electrode matrix 12 reaches the full thickness approximately continuously. In the case of thin electrode matrices in some instances, the zone 17 may for example have a thickness of less than 1 mm, but in the case of electrode matrices having a thickness of over 2 mm, zone 17 reaches extensions in the order of magnitude of around 2 mm.

Figure 2:
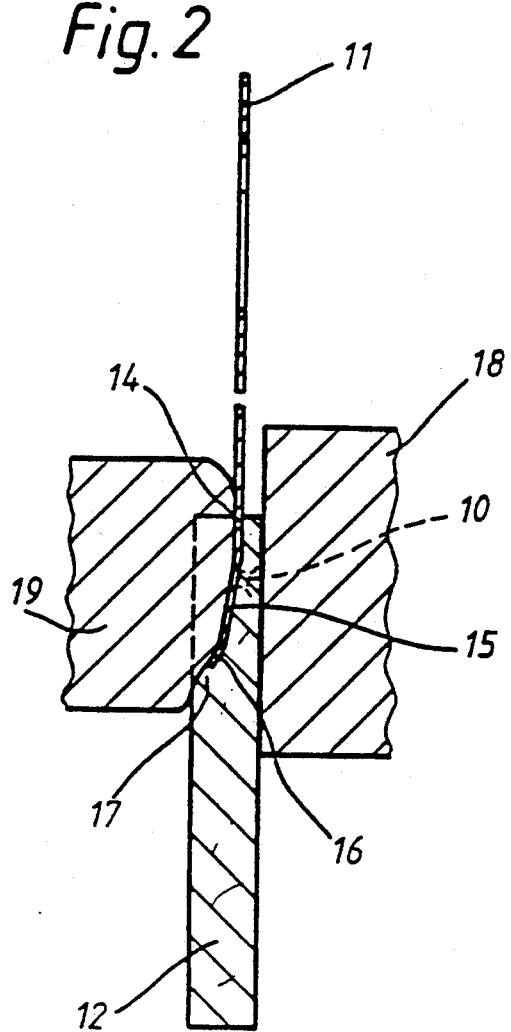
FIG. 2 shows the electrode matrix in FIG. 1 in cross section along the line II—II.
Figure 3:
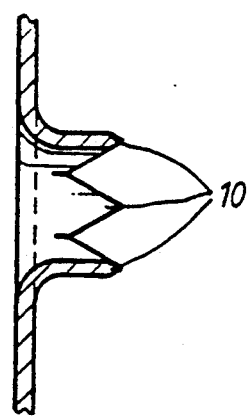
FIG. 3 shows a cross section through a current-collector lug with pierced material projections.
Figure 4:
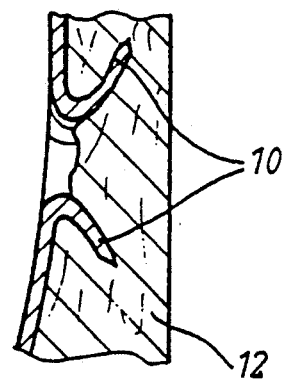
FIG. 4 shows a cross section through a collar of sheet-metal tabs as in FIG. 3 keyed into an electrode matrix.

FIG. 2 shows the side view from the right which has been sectioned along the line II—II in FIG. 1. Said side view again shows the current-collector lug 11 provided with pierced material projections, the electrode matrix 12 after the welding operation with the severely impressed zone 14, the anchored sheet-metal tabs 10 of the pierced material projections in the adjacent zone 15 which extends at an angle, the tapering zone 16 and the zone 17 which is adjacent thereto and which itself only serves to press the electrode matrix 12 without an abrupt transition. In FIG. 2, the lower welding electrode 18, which is preferably of straight and markedly larger construction than the actual welding zone, and the upper welding electrode 10 with its contour are shown in section. The enlargement of a not yet welded, pierced material protection of the current-collector lug 11 is shown in FIG. 3 and, after welding, in FIG. 4. In these figures it can readily be seen how the previously projecting sheet metal tabs 10 of the pierced material projections have bored after welding into the electrode matrix 12, have sheared off a few strands of the nickel-plated electrode matrix 12, have pushed other strands aside and have themselves been twisted or bent over during welding as a result of the pressing process, and are now in intimate contact with the fibers of the electrode matrix 12 even in their interior.

Figure 5:
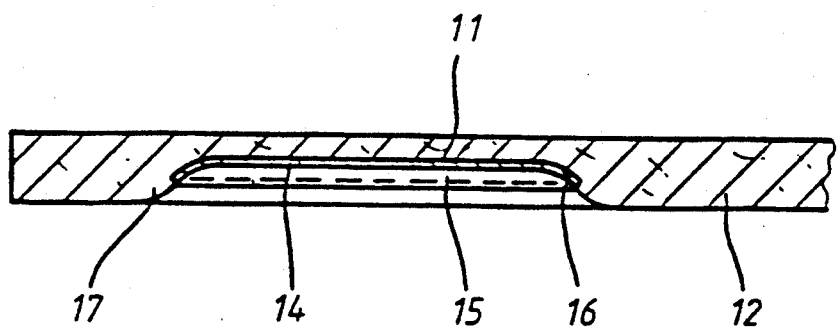
FIG. 5 shows the electrode matrix cut along the line V—V.

FIG. 5 shows the welded joint between the current-collector lug 11 provided with pierced material projections and the electrode matrix 12 in plan view along the section line V—V in FIG. 1, with the four different zones 14, 15, 16 and 17 which differ in the depth of pressing into the electrode matrix 12 and in their respective different designs of shape, and also the position of the pressed-in sheet-metal tabs 10 of the pierced material projections of the current-collector lug 11.

Figure 6:
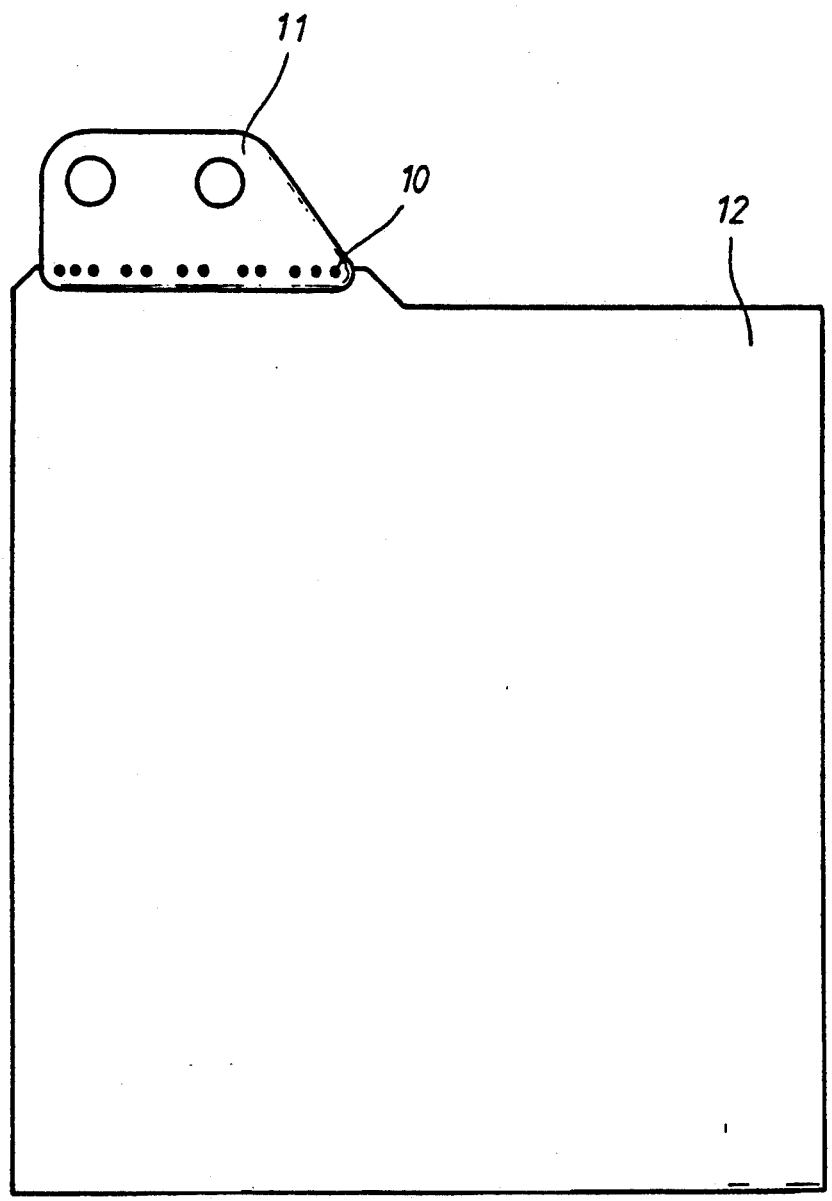
FIG. 6 shows a further front view of an electrode plate with current-collector lug mounted.

FIG. 6 shows a further exemplary embodiment in which the same geometry of the individual material projections as in FIG. 2 was used. Contact is again made off center to an electrode matrix 12' having the dimensions 121 mm high and 1 mm wide. Located at the upper side of the left-hand corner is the fixing of the current-collector lug which is provided with two through holes and whose center line of the first through hole has a spacing of approximately 12 mm from the left-hand periphery of the electrode matrix 12'. The width of the current-collector lug 11' is 42.5 mm and in its lower region—at a distance of 2 mm from the periphery—it has a row of twelve pierced material projections which are symmetrically arranged with one another with gaps. As shown in FIGS. 1 and 6, such material projections are advantageously arranged in a single row parallel to the edge of the matrix in the vicinity of the weld. From the left at a spacing of 2.5 mm there follow three pierced material projections each having a spacing of 2.5 mm, after a gap of 5 mm there then follow two pierced material projections again having a spacing of 2.5 mm from one another, etc. The arrangement is again symmetrical with respect to the center line of the current-collector lug 11'. The twelve pierced material projections have the same geometry as described in the first exemplary embodiment. The overlap of the electrode matrix 12' and of the current-collector lug 11' is 3 mm, with the result that the spacing of the penetrating, pierced material projections from the upper, reinforced periphery of the electrode matrix 12' is still 1 mm before welding. The thickness of the current-collector lug 11', constructed as a nickel sheet-metal strip, is 0.2 mm. The current-collector lug 11' furthermore has on the right an edge inclined at an angle of approximately 55°. The lower corners of the current-collector lug 11' are rounded with a radius of 2 mm and the upper ones with a radius of 6 mm. The electrode matrix 12' used is sized to 0.6 mm and its textile plate substrate comprises 110 g/m$^2$ and the nickel coating 60 mg of Ni/cm$^2$. The pressure for the welding electrode force is 3.0 bar. In the welding process, the current level power is set to 88% and the current time is 30 cycles. The squeeze time, post-weld holding time and off time were adopted from the first exemplary embodiment, but the closure time was doubled.

It has been found in practice that an electrode matrix according to the invention, with welded-on thin current-collector lug provided with pierced material projections with an electrode matrix thickness of 0.8 mm withstands a tensile force of 280N to 350N in a tensile test, with a breaking length of up to 12 mm, and with an electrode matrix thickness of 1.4 mm the electrode matrix/current-collector lug joint withstands a tensile force of 650N to 750N, with a breaking length of 5 to 7 mm. The electrode matrix also cannot be chipped off in the welding zone after welding with a weld of over 40 mm weld length in one welding operation, for example in the second exemplary embodiment. In the two exemplary embodiments, the welded joints described always have a higher strength than the electrode matrix itself.

The advantage achieved with the invention are, in particular, that the strength increases by over 10% if the weld is formed in accordance with the invention compared with a conventional electrode matrix with welded-on thin current-collector lug. As a result of providing the pierced material projections in the current-collector lug, the scrap generated during welding drops by up to 19% since, apart from the severely pressed zone 14 in the transition zone from 14 to zone 15, further severely pressed, punctiform zones having the extremely good contact necessary for welding exist over the current-free length during the welding operation, so that this joint is well welded-through everywhere not only in the pulling direction, but also in the direction transverse thereto. As a result, regions no longer occur in which the welding is more equivalent to a good gluing. In destructive tests, this is evident from the detachment in each case of the electrode matrix in circular form around each individual pierced material projection of the current-collector lug and at the reinforced periphery of the electrode matrix. Hitherto there were always areas in which it was possible to chip off the smooth current-collector lug two dimensionally without destroying the electrode matrix. As a result of the gradual transition from the severely compressed part carrying the welding seam to the full thickness of the electrode matrix, the periphery of the electrode matrix, which is reinforced by metallization and consequently particularly robust, and the areas around which the pierced material projections penetrate and displace and compact material are the most loaded and deformed by the welding operation. Lower pressing forces are exerted on the zones 15, 16, 17 adjacent thereto, which deform said zones 15, 16, 17 less severely, so that the deformation of the less heavily metallized electrode matrix is lower and approaches zero. In addition, abrupt transitions do not occur in the weld zone section and the zones adjacent thereto.

As a result of the marked drop in scrap numbers in the production of the welded joint and the manufacture subsequent thereto, fewer quality assurance measures have to be taken in electrode matrix production, impregnation, plate stack welding and cell assembly sector. In addition, substantial manufacturing time is saved in the case of the electrode matrix according to the invention with welded-on, thin current-collector lug 11, 11' having pierced material projections, for several reasons. First, the electrode matrix 12, 12' does not have to be impressed before welding; second, a sheet-metal section does not have to be spot-welded onto the current-collector lug 11, 11' before the actual welding; and finally, in carrying out the welding, one welding operation is sufficient and the welded joint does not have to be produced by means of multiple welding points. These savings in manufacturing times result in an increase in productivity. As a result of the shorter manufacturing times and the appreciable reduction in scrap, and also the provision of a very elastic joint between the electrode matrix 12, 12' and the welded-on thin current-collector lug 11, 11' (absorption of length changes of over 5 mm in contrast to hitherto standard joints of up to a maximum of 1.5 mm), the electrode matrix 12, 12' according to the invention with welded-on thin current-collector lug 11, 11' can be very satisfactorily used not only in stationary applications, but also in traction cells in which the cell components are exposed to varying stresses.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Electrode for electrochemical storage cells having an electrode matrix made of metallized plastic fibers with a current-collector leg welded on one side, thereof, wherein:

the current-collector lug overlaps the electrode matrix on one side at a periphery thereof;

said current-collector lug is compressed in the vicinity of the overlap to such an extent that the current-collector lug remains within the nominal thickness of the electrode matrix;

the current-collector lug has, in the overlap region, a plurality of material projections which project toward the electrode matrix, said projections having a diameter which is at least equal to a thickness of the material of the current-collector lug, and being pressed into the electrode matrix, said material projections pressed into the electrode matrix remain completely within the electrode matrix, even at the point of their highest elevation;

each of said material projections is formed as a collar having a plurality of projecting material tabs which are bent out of a projecting position and flared outwardly, into the interior of the electrode matrix, to form barbs which provide a mechanical connection with the compressed electrode matrix;

the number of collars is greater towards peripheral portions of the current-collector lug;

regions having a lower number of collars per unit length are arranged between said peripheral areas;

the electrode matrix is made of a nonwoven material;

porosity of the nonwoven material is between 50% and 98%;

weight per unit area of the nonwoven material is between 50 g/m$^2$ and 800 g/m$^2$;

plastic fibers of the nonwoven material have a diameter of 0.4 dtex to 7.3 dtex;

the plastic fibers have a length of between 15 mm and 80 mm;

the plastic fibers are activated, electrolessly metallized and are reinforced with a metal layer by electroplating; and nickel coating of the electrode matrix is between 25 mg and 300 mg of Ni/cm$^2$.

2. Electrode according to claim 1, wherein:

the current-collector lug has a thickness of between 0.1 and 1 mm;

an internal diameter of the pierced material projections of the sheet-metal tabs is between 0.5 mm and 1.5 mm;

height of the projecting sheet-metal tabs is approximately 0.2 mm to 1.0 mm; and individual sheet-metal tab collars are arranged at a minimum spacing from one another which corresponds to two to three times an external diameter of a collar.

3. Electrode according to claim 1, wherein:
said peripheral areas are heavily nickel plated;
spacing of mid-points of the collars from the heavily nickel-plated areas of the electrode matrix is approximately 1 mm to 1.5 mm before welding; and
spacing of the collars from a lower periphery of the current-collector lug is between 1 mm and 2.5 mm.

4. Electrode according to claim 2, wherein:
said peripheral areas are heavily nickel plated;
spacing of mid-points of the collars from the heavily nickel-plated areas of the electrode matrix is approximately 1 mm to 1.5 mm before welding; and
spacing of the collars from lower periphery of the current-collector lug is between 1 mm and 2.5 mm.

5. Electrode according to claim 1, wherein said material projections are arranged in a single row which is substantially parallel to an edge of said matrix adjacent an area where said lug is welded to said matrix.

6. Electrode for electrochemical storage cells having an electrode matrix made of metallized plastic fibers with a current-collector leg welded on one side, thereof, wherein:
the current-collector lug overlaps the electrode matrix on one side at a periphery thereof;
said current-collector lug is compressed in the vicinity of the overlap to such an extent that the current-collector lug remains within the nominal thickness of the electrode matrix;
the current-collector lug has, in the overlap region, a plurality of material projections which project toward the electrode matrix, said projections having a diameter which is at least equal to a thickness of the material of the current-collector lug, and being pressed into the electrode matrix,
said material projections pressed into the electrode matrix remain completely within the electrode matrix, even at the point of their highest elevation;
each of said material projections is formed as a collar having a plurality of projecting material tabs which are bent out of a projecting position and flared outwardly, into the interior of the electrode matrix, to form barbs which provide a mechanical connection with the compressed electrode matrix;
the number of collars is greater towards peripheral portions of the current-collector lug;

regions having a lower number of collars per unit length are arranged between said peripheral areas;
the electrode matrix is made of needle punched felt sheets;
porosity of said felt is between 50% and 98%;
weight per unit area of the felt is between 50 $g/m^2$ and 800 $g/m^2$;
plastic fibers of the felt have a diameter of 0.4 dtex to 7.3 dtex;
the plastic fibers have a length of between 15 mm and 80 mm;
the plastic fibers are activated, electrolessly metallized and are reinforced with a metal layer by electroplating; and
nickel coating of the electrode matrix is between 25 mg and 300 mg of $Ni/cm^2$.

7. Electrode according to claim 6, wherein:
the current-collector lug has a thickness of between 0.1 mm and 1 mm;
an internal diameter of the pierced material projections of the sheet-metal tabs is between 0.5 mm and 1.5 mm;
height of the projecting sheet-metal tabs is approximately 0.2 mm to 1.0 mm; and
individual sheet-metal tab collars are arranged at a minimum spacing from one another which corresponds to two to three times an external diameter of a collar.

8. Electrode according to claim 7, wherein:
said peripheral areas are heavily nickel plated;
spacing of mid-points of the collars from the heavily nickel-plated areas of the electrode matrix is approximately 1 mm to 1.5 mm before welding; and
spacing of the collars from lower periphery of the current-collector lug is between 1 mm and 2.5 mm.

9. Electrode according to claim 6, wherein:
said peripheral areas are heavily nickel plated;
spacing of mid-points of the collars from the heavily nickel-plated areas of the electrode matrix is approximately 1 mm to 1.5 mm before welding; and
spacing of the collars from a lower periphery of the current-collector lug is between 1 mm and 2.5 mm.

10. Electrode according to claim 6, wherein said material projections are arranged in a single row which is substantially parallel to an edge of said matrix adjacent an area where said lug is welded to said matrix.

* * * * *